US011457460B2

(12) United States Patent
Bai et al.

(10) Patent No.: US 11,457,460 B2
(45) Date of Patent: Sep. 27, 2022

(54) INTER-CELL INTERFERENCE COORDINATION IN MMWAVE NETWORKS

(71) Applicant: QUALCOMM Incorporated, San Diego, CA (US)

(72) Inventors: Tianyang Bai, Somerville, NJ (US); Junyi Li, Chester, NJ (US); Jung Ho Ryu, Fort Lee, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/099,291

(22) Filed: Nov. 16, 2020

(65) Prior Publication Data

US 2021/0258979 A1   Aug. 19, 2021

Related U.S. Application Data

(60) Provisional application No. 62/976,013, filed on Feb. 13, 2020.

(51) Int. Cl.
*H04W 72/12* (2009.01)
*H04W 24/10* (2009.01)
*H04W 72/04* (2009.01)
*H04L 5/00* (2006.01)
*H04B 17/336* (2015.01)
(Continued)

(52) U.S. Cl.
CPC ...... *H04W 72/1231* (2013.01); *H04B 7/0626* (2013.01); *H04B 17/318* (2015.01); *H04B 17/336* (2015.01); *H04L 5/005* (2013.01); *H04W 24/10* (2013.01); *H04W 56/001* (2013.01); *H04W 72/042* (2013.01); *H04W 72/046* (2013.01); *H04W 72/0446* (2013.01);
(Continued)

(58) Field of Classification Search
CPC ............ H04W 72/1231; H04W 24/10; H04W 56/001; H04W 72/042; H04W 72/0446; H04W 72/0453; H04W 72/046; H04W 72/1242; H04B 7/0626; H04B 17/318; H04B 17/336; H04B 7/0695; H04B 17/345; H04L 5/005; H04J 11/0056
See application file for complete search history.

(56) References Cited

U.S. PATENT DOCUMENTS

2014/0192734 A1* 7/2014 Ng ........................ H04L 5/0035
370/329
2018/0270835 A1* 9/2018 Chen ..................... H04W 72/10
2020/0084766 A1* 3/2020 Pawlak ............. H04W 72/0446

* cited by examiner

*Primary Examiner* — Eric Myers
(74) *Attorney, Agent, or Firm* — Procopio, Cory, Hargreaves & Savitch LLP

(57) ABSTRACT

A configuration for inter-cell interference coordination in wireless communication systems. The apparatus determines a priority order of a first base station to schedule a first transmission with a first UE. The apparatus transmits a first transmission request to the first UE to schedule the first transmission. The apparatus receives, from the first UE, a measurement report based on the first transmission request received by the first UE, the measurement report indicates a signal quality of the first transmission request. The apparatus determines to schedule the first transmission with the first UE based at least on the measurement report. The apparatus sends a schedule indication to at least a second base station indicating whether the first transmission is scheduled with the first UE, at least the second base station has a lower priority order than the first base station.

19 Claims, 11 Drawing Sheets

(51) Int. Cl.
*H04B 7/06* (2006.01)
*H04W 56/00* (2009.01)
*H04B 17/318* (2015.01)

(52) U.S. Cl.
CPC ... *H04W 72/0453* (2013.01); *H04W 72/1242* (2013.01)

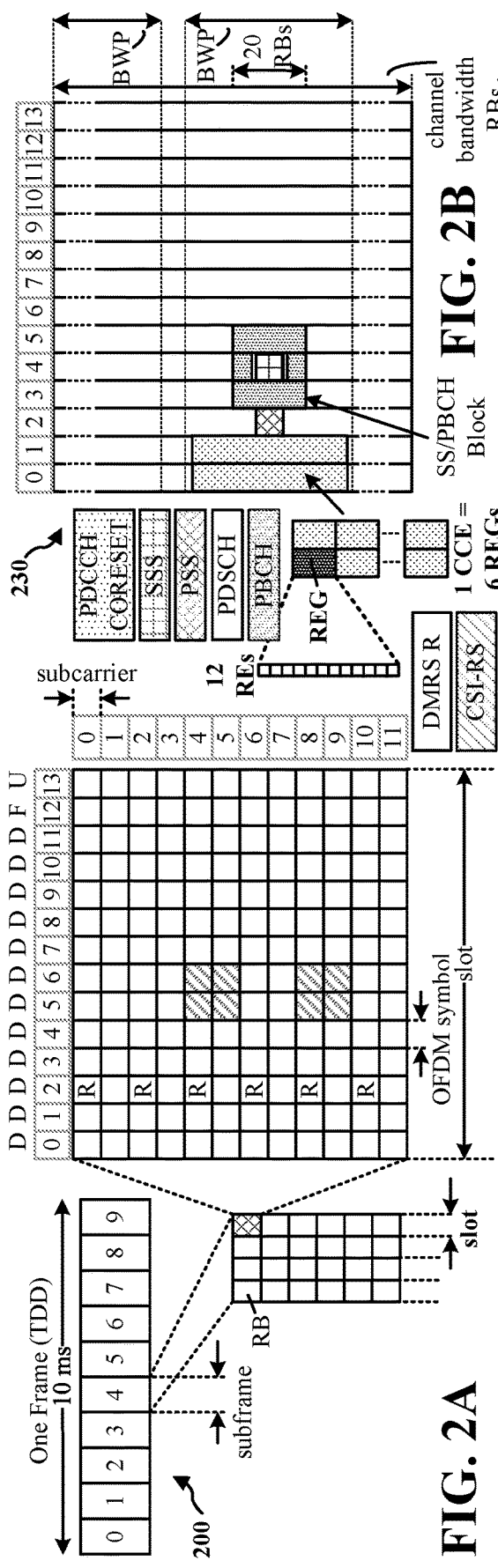
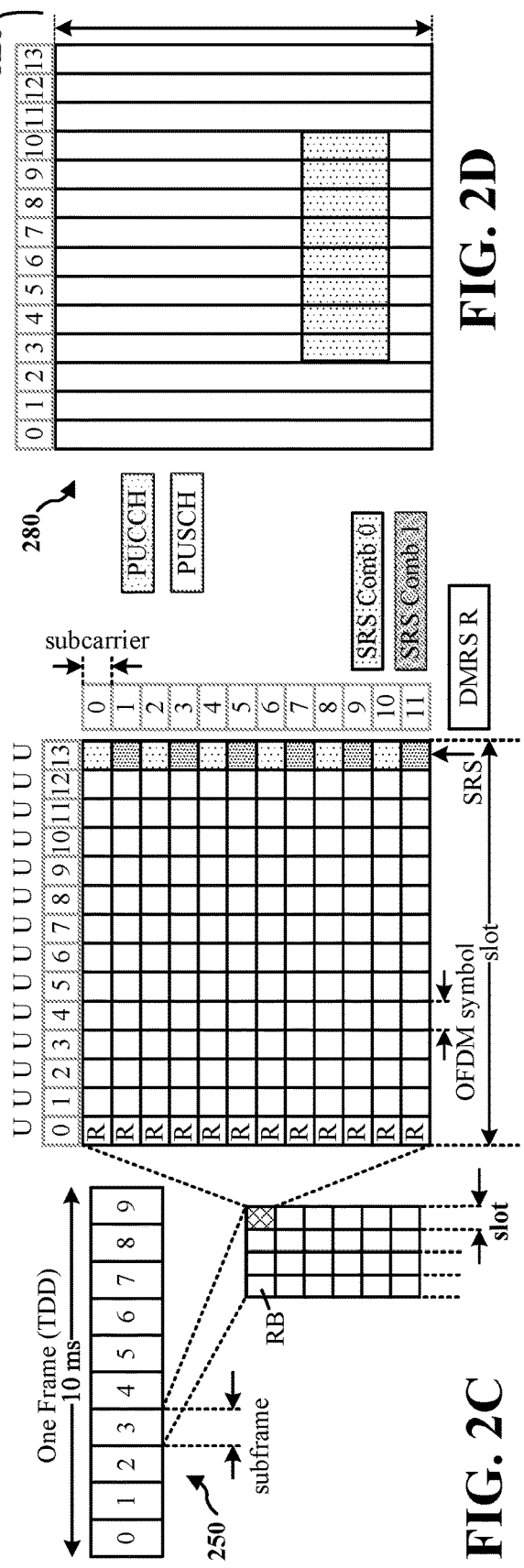
FIG. 2A
FIG. 2B
FIG. 2C
FIG. 2D

INTER-CELL INTERFERENCE COORDINATION IN MMWAVE NETWORKS

CROSS REFERENCE TO RELATED APPLICATION(S)

This application claims the benefit of U.S. Provisional Application Ser. No. 62/976,013, entitled "Design for Inter-Cell Interference Coordination in mmWave Networks" and filed on Feb. 13, 2020, which is expressly incorporated by reference herein in its entirety.

BACKGROUND

Technical Field

The present disclosure relates generally to communication systems, and more particularly, to a configuration for inter-cell interference coordination in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some wireless communication systems may include transmitters (e.g., base stations or user equipments (UEs)) that utilize directional beamforming in an effort to enhance signal to noise ratio (SNR). In such communication systems, interference may become more directional than in instances of transmitters transmitting omni-directional transmissions. In some wireless communication systems, such as millimeter wave (mmW) systems, coordination of the directional transmission may be helpful in order mitigate interference from multiple mmW transmitters. Enhanced coordination of directional transmissions may allow for multiple transmitters to transmit effectively, while minimizing interference. As such, coordination of transmissions between a transmitter and UE may avoid inter-cell interference between neighboring transmitters when scheduling a transmission to a UE within respective cells.

In an aspect of the disclosure, a method, a computer-readable medium, and an apparatus are provided. The apparatus may be a device at a first base station. The device may be a processor and/or a modem at a first base station or the first base station itself. The apparatus determines a priority order of the first base station to schedule a first transmission with a first user equipment (UE). The apparatus transmits a first transmission request to the first UE to schedule the first transmission. The apparatus receives, from the first UE, a measurement report based on the first transmission request received by the first UE, wherein the measurement report indicates a signal quality of the first transmission request. The apparatus determines to schedule the first transmission with the first UE based at least on the measurement report. The apparatus sends a schedule indication to at least a second base station indicating whether the first transmission is scheduled with the first UE, wherein at least the second base station has a lower priority order than the first base station.

In an aspect of the disclosure, a method, a computer-readable medium, and an apparatus are provided. The apparatus may be a device at a UE. The device may be a processor and/or a modem at a UE or the UE itself. The apparatus receives, from a first base station, a first transmission request to schedule a first transmission, wherein the first UE is within a first cell of the first base station. The apparatus receives, from at least a second base station, a second transmission request to schedule a second transmission with a second UE. The apparatus transmits, to the first base station, a measurement report based at least on the first and second transmission requests, wherein the measurement report indicates a signal quality of the first transmission request. The apparatus receives, from the first base station, an indication indicating whether the first transmission is scheduled.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
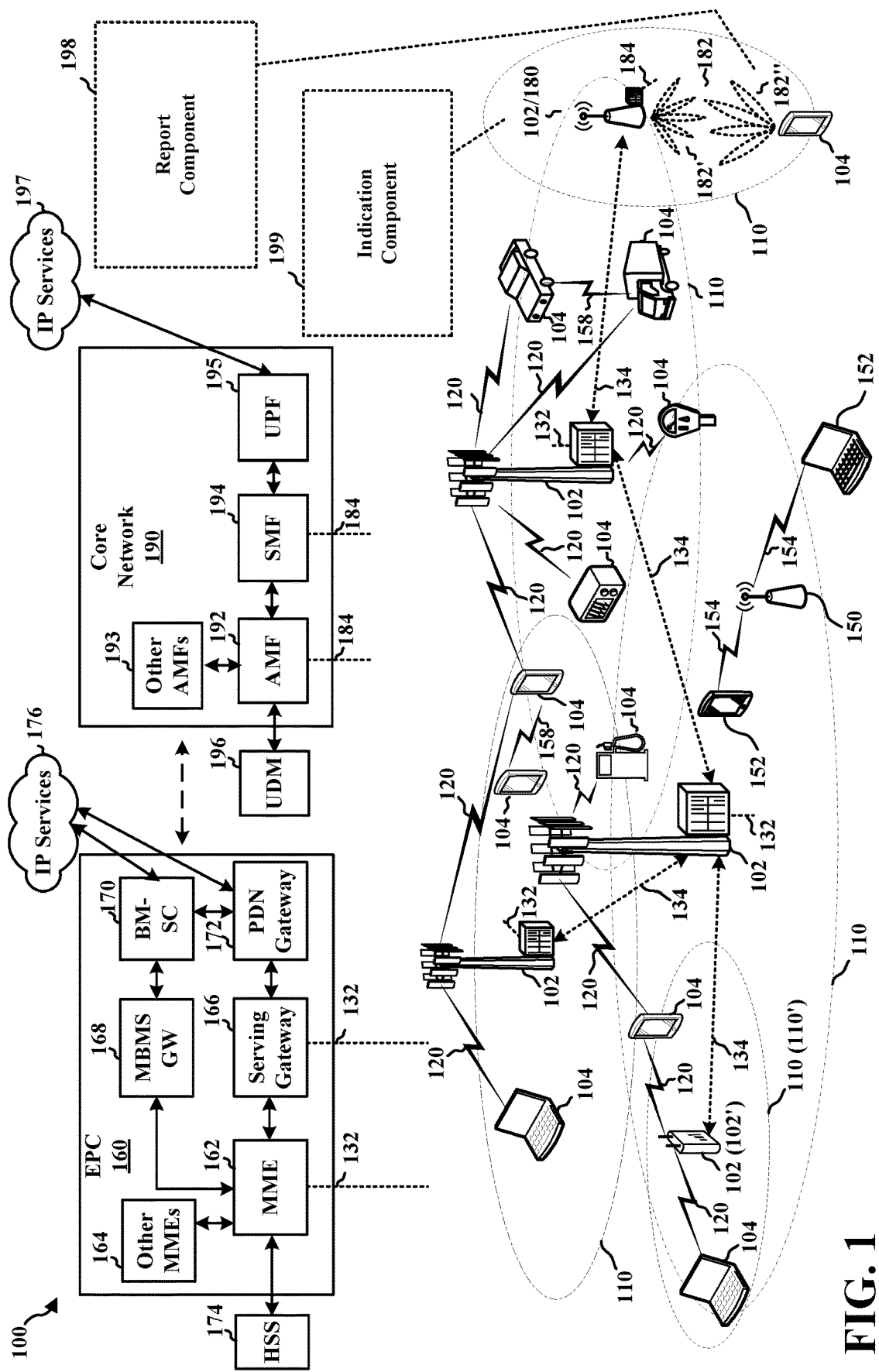
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a measurement report to a first base station to indicate the link quality between the UE and the first base station. For example, the UE 104 of FIG. 1 may include a report component 198 configured to transmit, to the first base station, the measurement report based at least on a first and second transmission request from the first base station and a second base station, respectively. The UE 104 may receive, from the first base station, a first transmission request to schedule a first transmission, wherein the UE 104 is within a first cell of the first base station. The UE 104 may receive, from at least the second base station, the second transmission request to schedule a second transmission with a second UE. The UE 104 may transmit, to the first base station, the measurement report based at least on the first and second transmission requests, wherein the measurement report indicates a signal quality of the first transmission request. The UE 104 may receive, from the first base station, an indication indicating whether the first transmission is scheduled.

Referring again to FIG. 1, in certain aspects, the base station 102/180 may be configured to send a schedule indication to at least a second base station indicating whether a first transmission is scheduled with a first UE. For example, the base station 102/180 of FIG. 1 may include an indication component 199 configured to send the schedule indicating to at least the second base station indicating whether the first transmission is scheduled with the first UE. The first base station 102/180 may determine a priority order of the first base station 102/180 to schedule a first transmission with a first UE. The first base station 102/180 may transmit a first transmission request to the first UE to schedule the first transmission. The first base station 102/180 may receive, from the first UE, a measurement report based on the first transmission request received by the first UE, wherein the measurement report indicates a signal quality of the first transmission request. The first base station 102/180 may determine to schedule the first transmission with the first UE based at least on the measurement report. The first base station 102/180 may send a schedule indication to at least a second base station indicating whether the first transmission is scheduled with the first UE, wherein at least the second base station has a lower priority order than the first base station.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2\mu$ slots/subframe. The subcarrier spacing and symbol length/duration are a function of the numerology. The subcarrier spacing may be equal to $2^\mu*15$ kHz, where µ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
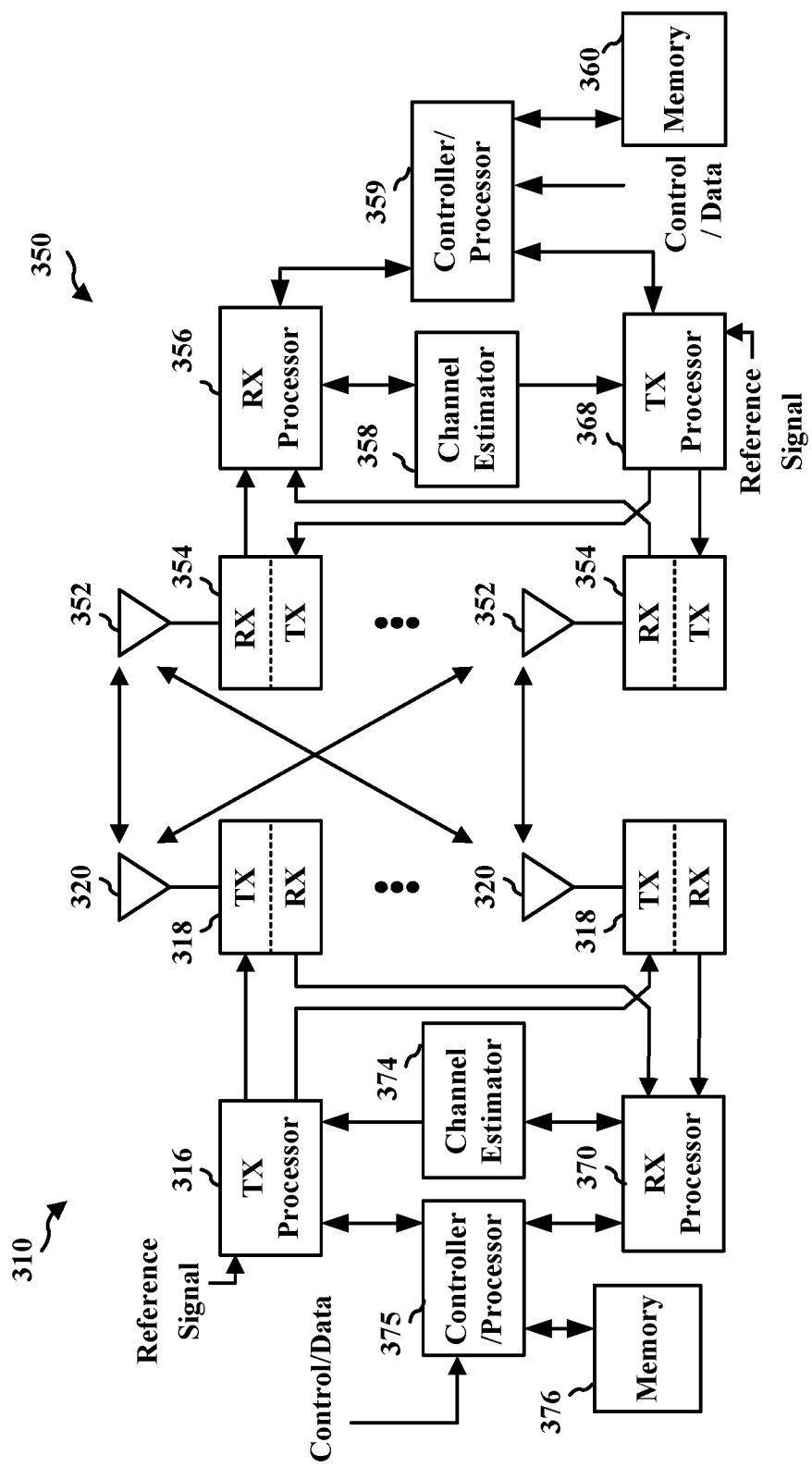
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some wireless communication systems may include transmitters (e.g., base stations or user equipments (UEs)) that utilize directional beamforming in an effort to enhance signal to noise ratio (SNR). In such communication systems, interference may become more directional than in instances of transmitters transmitting omni-directional transmissions. In some wireless communication systems, such as millimeter wave (mmW) systems, coordination of the directional transmission may be helpful in order mitigate interference from multiple mmW transmitters. Enhanced coordination of directional transmissions may allow for multiple transmitters to transmit effectively, while minimizing interference. As such, coordination of transmissions between a transmitter and UE may avoid inter-cell interference between neighboring transmitters when scheduling a transmission to a UE within respective cells.

Some wireless systems may utilize a centralized method to coordinate transmissions. For example, each UE may measure all the potential beams of neighboring cells, and each UE reports their measurements to a central node. The central node may determine scheduling decisions for all of the base stations based on all the measurements received from the UEs. The central node may determine the scheduling decisions in an effort to maximize throughput. However, a large amount of signaling overhead may result from such a centralized method which could result in inefficient use of resources.

Figure 4:
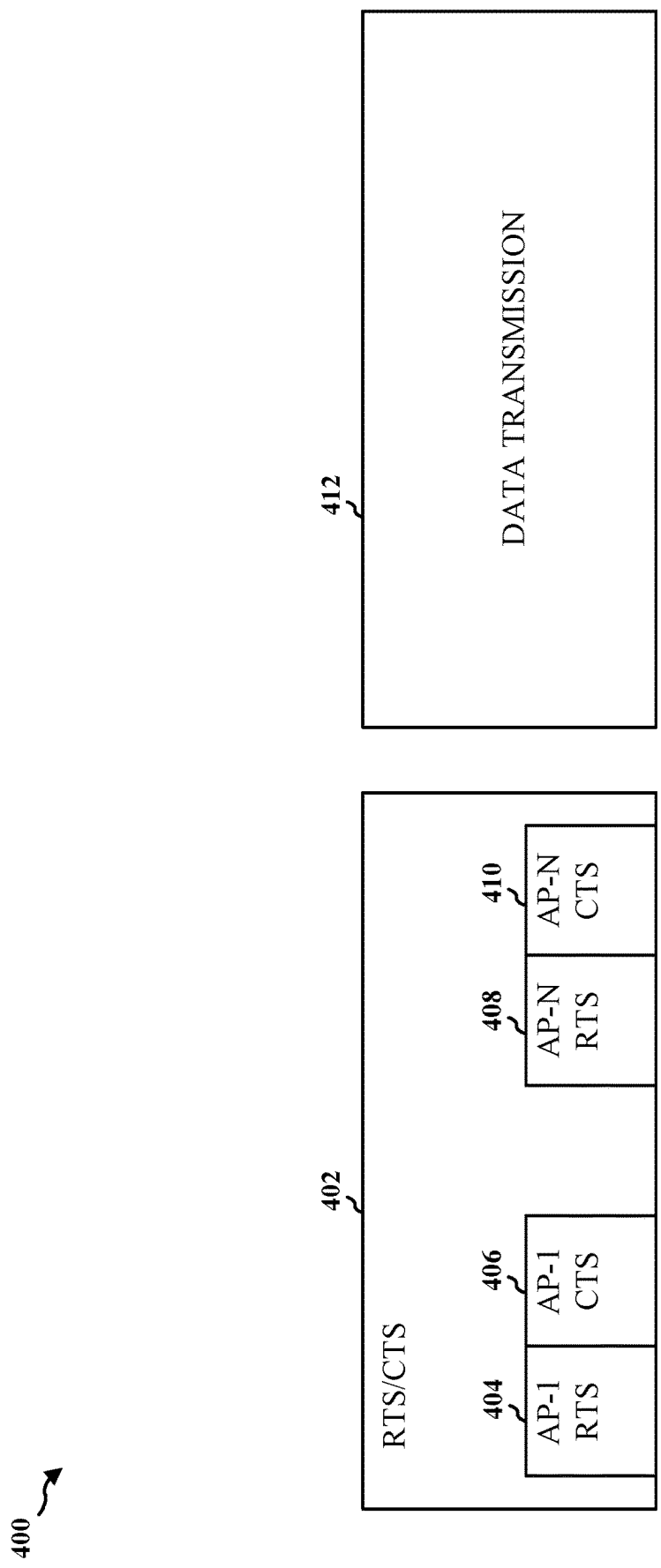
FIG. 4 is a diagram illustrating an example of a wireless communication system.

FIG. 4 is a diagram 400 of a wireless communication (e.g., WiFi) system utilizing a distributed method to coordinate transmissions. WiFi systems may use a distributed method that utilizes a request to send (RTS) and clear to send (CTS) signaling. The diagram 400 may include a synchronized WiFi system with multiple access points (APs). The diagram 400 may include a time slot 402 that is dedicated before each data transmission time 412. The time slot 402 allows for RTS/CTS signaling. APs that wants to transmit are assigned with an order of priority. For example, AP-1 is assigned with the highest priority, while AP-N is assigned a lower priority than AP-1. AP-1 may send an RTS 404 to its intended receiver, and may receive a positive CTS during the CTS 406 time of AP-1. AP-1 having the highest priority may not encounter issues in scheduling transmissions.

With respect to AP-N, when the time for AP-N to transmit occurs, AP-N sends an RTS 408 to its intended receiver (e.g., UE). All the other receivers may measure the strength of the RTS 408 sent by AP-N as interference from AP-N. The intended receiver of the RTS 408 may also measure the signal power of the received RTS 408. During the CTS 410 time for AP-N, the intended receiver may respond with a positive CTS to acknowledge the RTS 408 from AP-N. In instances where the intended receiver transmits a positive CTS, the positive CTS may indicate that the serving link signal to interference noise ratio (SINR) between the intended receiver and the AP-N is adequate. Other UEs that are intended to be scheduled to receive transmissions from other APs having a higher priority than AP-N may send a negative CTS to block the transmission between the AP-N and the intended receiver. The transmission between the AP-N and the intended receiver may be blocked by UEs scheduled to receive transmissions from higher priority APs due to the transmission between the AP-N and the intended receiver causing interference with the UEs scheduled to receive transmissions from higher priority APs. Once the AP-N receives a positive CTS during its CTS time 410, then the AP-N may proceed with its data transmission 412. However, there may be some difficulty in applying the distributed method of WiFi systems into cellular networks.

Figure 5:
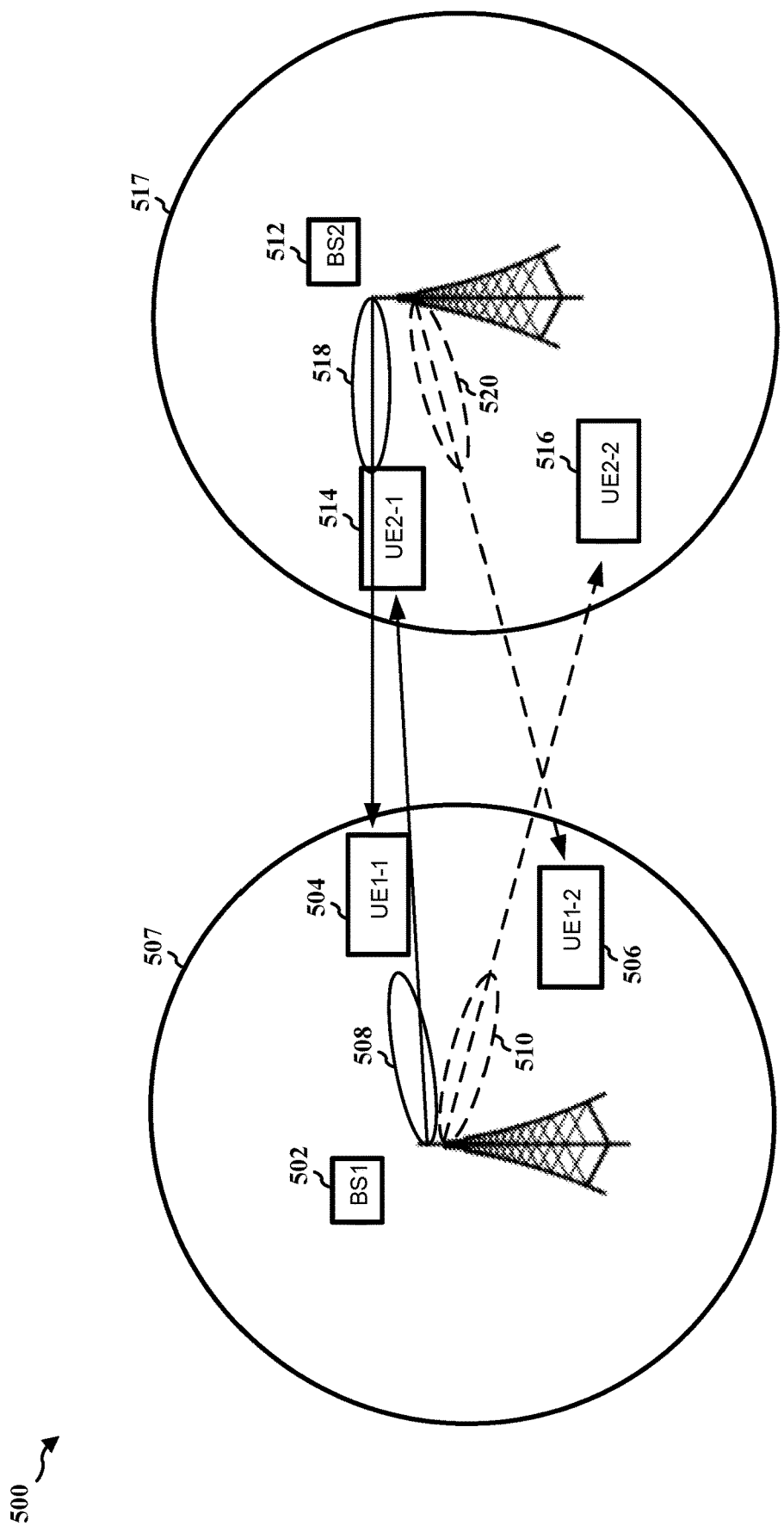
FIG. 5 is a diagram illustrating an example of a wireless communication system.

FIG. 5 is a diagram 500 of a cellular network utilizing a distributed method to coordinate transmissions. The diagram 500 includes a first base station 502 (e.g., BS 1), a first UE 504 (e.g., UE1-1), and a second UE 506 (e.g., UE1-2), where the first and second UEs 504, 506 are within a cell 507 of the first base station 502. The first base station 502 may communicate with the first UE 504 via a first beam 508, and may communicate with the second UE 506 via a second beam 510. The diagram 500 further includes a second base station 512 (e.g., BS2), a first UE 514 (e.g., UE2-1), and a second UE 516 (e.g., UE2-2), where the first and second UEs 514, 516 are within a cell 517 of the second base station 512. The second base station 512 may communicate with the first UE 514 via a first beam 518, and may communicate with the second UE 516 via a second beam 520. The first and second base stations 502, 512 may be within a base station group. In such instances, all the base stations within the same group may potentially interfere with each other.

As shown in FIG. 5, the beam 508 of the first base station 502 serving the first UE 504 may interfere with the first UE 514 being served by the beam 518 of the second base station 512. In addition, the beam 510 of the first base station 502 serving the second UE 506 may interfere with the second UE 516 being served by the beam 520 of the second UE 506. The beam 518 of the second base station 512 serving the first UE 514 may interfere with the beam 508 of the first UE 504. The beam 520 of the second base station 512 serving the second UE 516 may interfere with the second UE 506 being served by the beam 510 of the first base station 502. The base station 502 serving the second UE 506 may not interfere with the first UE 514 being served by the second base station 512. The base station 502 serving the first UE 504 may not interfere with the second UE 516 being served by the second base station 512. Interference may not occur due to the directional beams (e.g., 508, 510) being used by the first base station 502 or due to the directional beams (e.g., 518, 520) being used by the second base station 512.

In instances where the distributed method of RTS/CTS is applied to the cellular network of FIG. 5, then for each slot, each base station within the group of base stations may determine their scheduling priority. In an example where the first base station 502 transmits an RTS signal to its intended UE (e.g., the first UE 504), the first UE 514 being served by the second base station 512 may measure the RTS sent by the first base station 502 in order to measure interference from the first base station 502. The first UE 504 may send a CTS signal if the link between the first base station 502 and the first UE 504 meets a threshold (e.g., predetermined or configured). In some instances, the link between the first UE 504 and the first base station 502 may not meet the threshold to schedule the transmission due to blocking. The link between the first base station 502 and the first UE 504 may schedule the transmission if the SINR is higher than a threshold. The first base station 502 may schedule the transmission with the first UE 504 upon receipt of a positive CTS, and may commence data transmission with the first UE 504.

The second base station 512, may have a lower priority than the first base station 502, and may send an RTS signal to its intended device (e.g., first UE 514). The first UE 514, being served by the second base station 512, may determine the SINR of the link between the second base station 512 and the first UE 514 based on the RTS received from base stations (e.g., first base station 502) having a higher priority than the second base station 512. The first UE 514 may then send a CTS to the second base station 512 based on the SINR calculation. In some aspects, the first UE 514 may not send a positive CTS signal due to the first base station 502 interfering with the first UE 514, regardless of whether the transmission between the first base station 502 and the first UE 504 is scheduled or not. As such, the scheduled transmission for the first UE 514 may be blocked independent of whether the transmission between the first base station 502 and the first UE 504 is scheduled or not. The distributed method may not account for or take into consideration whether the transmission between higher priority base stations and UEs is actually scheduled.

As discussed above, with regard to the diagram 500 of FIG. 5, the RTS of an unscheduled transmission may block the transmission of lower priority base stations. Low priority base stations do not know whether the RTS of a higher priority base station will be accepted. Lower priority base stations not receiving an indication as to whether the RTS of a higher priority base station being accepted may not allow for a maximum reuse of frequency resources, which may be an issue in cellular networks.

The present disclosure is directed to providing a phase of feedback to inform lower priority base stations of the scheduling decisions of higher priority base stations. Base stations within a group of base station may be configured to make scheduling decisions in order or priority, and provide an indication to lower priority base stations as to whether scheduled transmissions of higher priority base stations occur or not may allow for lower priority scheduled transmissions to occur and not be blocked due to possible interference from higher priority base stations.

Figure 6:
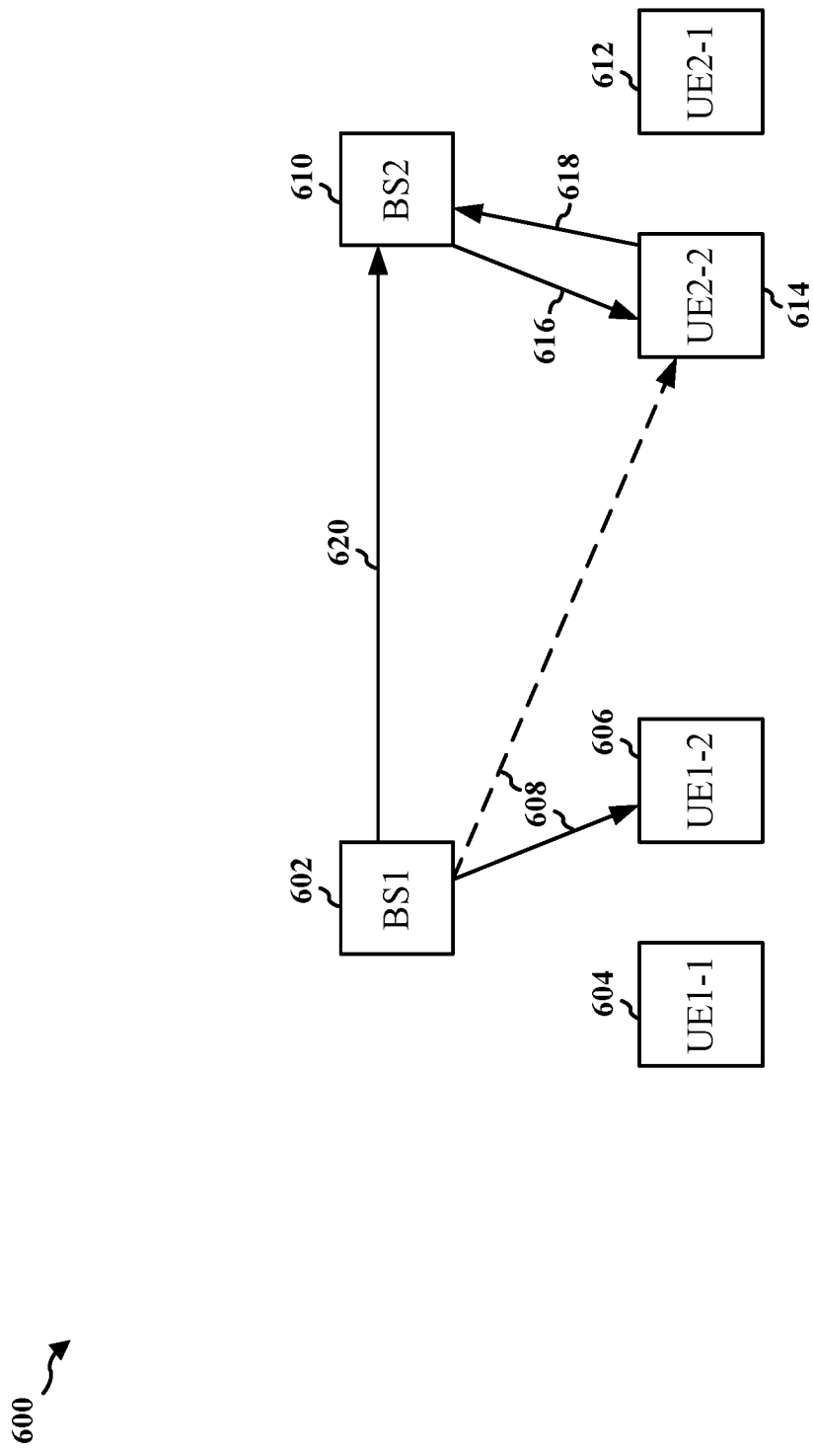
FIG. 6 is a diagram illustrating an example of a wireless communication system.

FIG. 6 is a diagram 600 of a cellular network utilizing an enhanced distributed method to coordinate transmissions. The diagram 600 includes a first base station 602 (e.g., BS1), a first UE 604 (e.g., UE1-1), and a second UE 606 (e.g., UE1-2), where the first and second UEs 604, 606 are within a cell of the first base station 602. The diagram 600 further includes a second base station 610 (e.g., BS2), a first UE 612 (e.g., UE2-1), and a second UE 614 (e.g., UE2-2), where the first and second UEs 612, 614 are within a cell of the second base station 610.

The base stations 602, 610 may be within a base station group and may determine their priority order for a time duration to schedule transmissions. In some aspects, the time duration may include one or more slots. Each base station may be configured to send an RTS signal to the intended receiver using a directional beam. In some aspects, the RTS may be sent via CSI-RS or SSB. The RTS from each respective base station may be sent via different resources or preambles such that the UEs can distinguish the sender of the RTS. For example, the first base station 602 may have a higher priority than the second base station 610, and may send an RTS signal 608 to the second UE 606. The second base station 610 having a lower priority than the first base station 602, must wait its turn and may send an RTS signal 616 to its second UE 614.

The UEs may be configured to receive an RTS signal from its serving base station or other base stations via a receive beam. The receive beam may be identified based on the signaling. The receive beam may be the beam that the UE will use to receive data from its serving cell.

UEs may be configured to report measurements based on the RTS signal received from its serving base station. The report may include an indication of the strength of the RTS signal, for example, the reference signal received power (RSRP) value, interference value, or if interference is stronger than a threshold. The serving base station may be configured to measure the RSRP of the link based on the report received from the UE. In some aspects, the report may be triggered by the serving base station. For example, the UE may send the report in response to receiving the RTS from the serving base station. In some aspects, the UE sending the report by be triggered if a transmission has been scheduled, and the measured interference by the UE is higher than a threshold. For example, the second base station 610 may send an RTS 616 to the second UE 614. The second UE 614 measures the RTS 616 received from the second base station 610, as well as the RTS 608 received from the first base station 602. The second UE 614 may measure the interference levels from the first base station 602 based on the strength of the RTS 608. The RTS 608 is transmitted by the first base station 602 to the second UE 606, in order to schedule a transmission between the first base station 602 and the second UE 606, which is served by the first base station 602. The second UE 614 then transmits the report 618 to the second base station 610, which is based on the RTS 616 and RTS 608.

The second base station 610 receives the report 618 and may be configured to determine whether to schedule the transmission with the second UE 614 based on the report 618. The second base station 610 may also take into account whether the transmission between the first base station 602 and the second UE 606 is scheduled to occur, due to the first base station 602 sending an indication 620 to the second base station 610. The indication 620 may inform the second base station 610 whether the scheduled transmission between the first base station 602 and the second UE 606 will occur or not. In some instances, the indication 620 may prevent the scheduled transmission between the second base station 610 and the second UE 614 from occurring if such transmission would interfere with the transmission between the first base station 602 and the second UE 606. In some instances, the second base station 610 may determine to schedule the transmission with the second UE 614 due to the indication 620 indicating that the scheduled transmission between the first base station 602 and the second UE 606 will not occur. The scheduled transmission between the first base station 602 and the second UE 606 not occurring may not cause interference to the scheduled transmission between the second base station 610 and the second UE 614. Thus, even though a transmission between the first base station 602 and the second UE 606 could potentially cause interference with the transmission between the second base station 610 and the second UE 614, the indication 620 informing the second base station 610 that such transmission is not scheduled to occur allows for the second base station 610 to schedule the transmission with the second UE 614.

Figure 7:
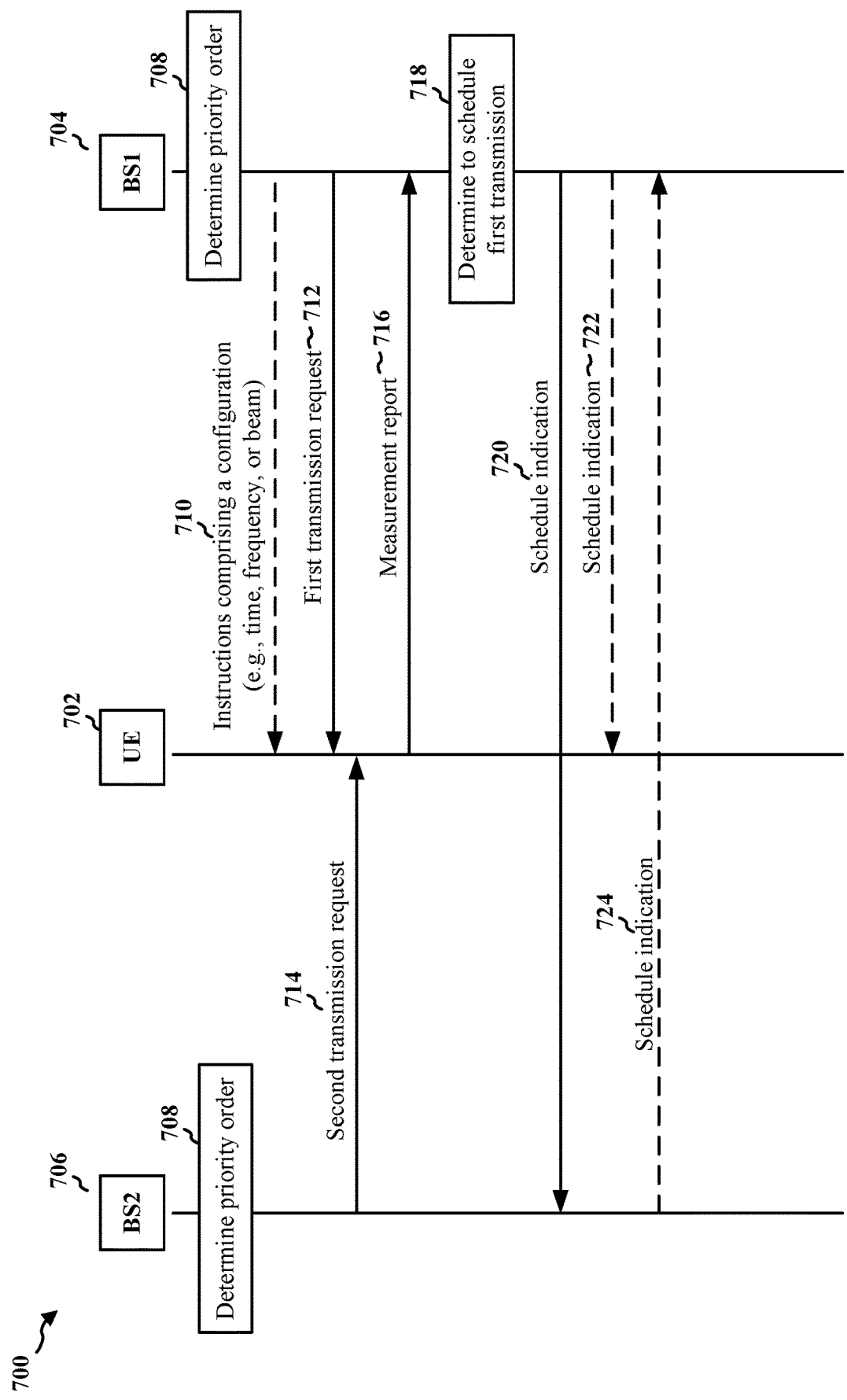
FIG. 7 is a call flow diagram of signaling between a UE and one or more base stations.

FIG. 7 illustrates an example communication flow 700 between a UE 702 and base stations 704, 706. Optional aspects are illustrated with a dashed line. The base station 704 may provide a cell serving the UE 702. For example, in the context of FIG. 1, the base station 704 may correspond to base station 102/180 and, accordingly, the cell may provide a geographic coverage area 110 in which communication coverage is provided and/or small cell 102' having a coverage area 110'. Further, the UE 702 may correspond to at least UE 104. In another example, in the context of FIG. 3, the base station 704 may correspond to the base station 310 and the UE 702 may correspond to the UE 350.

As illustrated at 708, the first and second base stations 704, 706 may determine a priority order for scheduling transmissions. The first base station 704 may determine the priority order of the first base station 704 to schedule a first transmission with the UE 702. The second base station 706 may determine its priority order to schedule a transmission with a UE within its serving cell. In the aspect of FIG. 7, the UE 702 is within the serving cell of base station 704, and the base station 704 has a higher priority than the base station 706. In some aspects, the first base station 704 may be within a group of base stations (e.g., 704, 706). In some aspects, a time duration of the priority order may comprise one or more slots.

In some aspects, for example as illustrated at 710, the first base station 704 may transmit, to the UE 702, instructions comprising a configuration indicating a time, a frequency, or a beam for the UE 702 to receive a first transmission request. The instructions may instruct the UE 702 to receive at least a second transmission request from at least the second base station. In some aspects, the instructions may instruct the UE 702 to use the same receive beam to receive the first transmission request from the first base station and the second transmission request from the second base station 706. The example of FIG. 7 includes a group of base stations comprised of the first base station 704 and the second base station 706. However, the disclosure is not intended to be limited to the aspects disclosed herein. In some aspects, the group of base stations may comprise more than one base stations.

As illustrated at 712, the first base station 704 may transmit the first transmission request to the UE 702. The first base station 704 may transmit the first transmission request to the UE 702 to schedule a first transmission. In some aspects, to transmit the first transmission request, the first base station 704 may transmit the first transmission request using a first beam. The first beam may be used to transmit the first transmission to the UE 702. The first beam may be a PDSCH beam of the UE 702.

In some aspects, for example as illustrated at 714, the second base station 706 may transmit the second transmission request to the UE 702. The second base station 706 may transmit the second request to the UE 702 based on the order of priority, and in a manner consistent with the transmission of the first transmission request from the first base station 704 to the UE 702.

As illustrated at 716, the UE 702 may transmit a measurement report. The UE 702 may transmit the measurement report to the first base station 704. The measurement report may be based at least on the first and second transmission requests 712, 714. The measurement report may indicate a signal quality of the first transmission request 712. In some aspects, the measurement report may include interference measurements from at least the second base station 706. In some aspects, the measurement report may reject the first transmission request if the measurement report indicates that the interference measurements from at least the second base station 706 exceeds a threshold. In some aspects, the measurement report may approve the first transmission request if the measurement report indicates that the interference measurements from at least the second base station 706 do not exceed the threshold. In some aspects, the measurement report may be transmitted to the first base station 704 in response to the UE 702 receiving the first transmission request. In some aspects, the measurement report may indicate a signal strength of the first transmission request, a RSRP value of the first transmission request, an interference value, or interference measurements received at the UE 702, or whether interference measurements received at the UE 702 exceed a threshold.

As illustrated at 718, the first base station 704 may determine to schedule the first transmission with the UE 702 based at least on the measurement report received from the UE 702. In some aspects, the measurement report indicates a signal power, a SNR, or an SINR or a link between the first base station 704 and the UE 702. In some aspects, the measurement report may indicate interference measurements from at least the second base station 706. In some aspects, to determine to schedule the first transmission with the first UE, the first base station may determine whether the measurement report indicates that the signal quality of the first transmission request is interfered by at least the second base station.

As illustrated at 720, the first base station 704 may send a schedule indication to at least the second base station 706. The schedule indication may indicate, to the least the second base station 706, whether the first transmission is scheduled with the UE 702. In some aspects, the at least the second base station 706 may have a lower priority order than the first base station 704.

In some aspects, for example as illustrated at 722, the first base station 704 may transmit a schedule indication to the UE 702. The schedule indication may indicate whether the first transmission is scheduled with the UE 702. In some aspects, to send the schedule indication, the first base station 704 may send an interference report to at least the second base station 706. The interference report may indicate that the at least the second base station 706 interferes with the first transmission between the first base station 704 and the UE 702. In some aspects, the interference report may prevent at least the second base station 706 from scheduling a second transmission with a second UE (not shown) if at least the second base station 706 interferes with the first transmission between the first base station 704 and the UE 702.

In some aspects, for example as illustrated at 724, the first base station 704 may determine whether a schedule indication from another base station (e.g., second base station 706 or other base station (not shown)) has been received by the first base station 704, where the another base station has a higher priority than the first base station 704. The schedule indication from a third base station (not shown) may indicate whether the third base station has scheduled a third transmission with a third UE. In some aspects, the first base station 704 may determine to schedule the first transmission with the UE 702 based at least on the schedule indication from the third base station. For example, the first base station 704 may determine to schedule the first transmission with the UE 702 if the schedule indication from the third base station (not shown) indicates that the first transmission would interfere with the third transmission between the third base station and the third UE (not shown).

Figure 8:
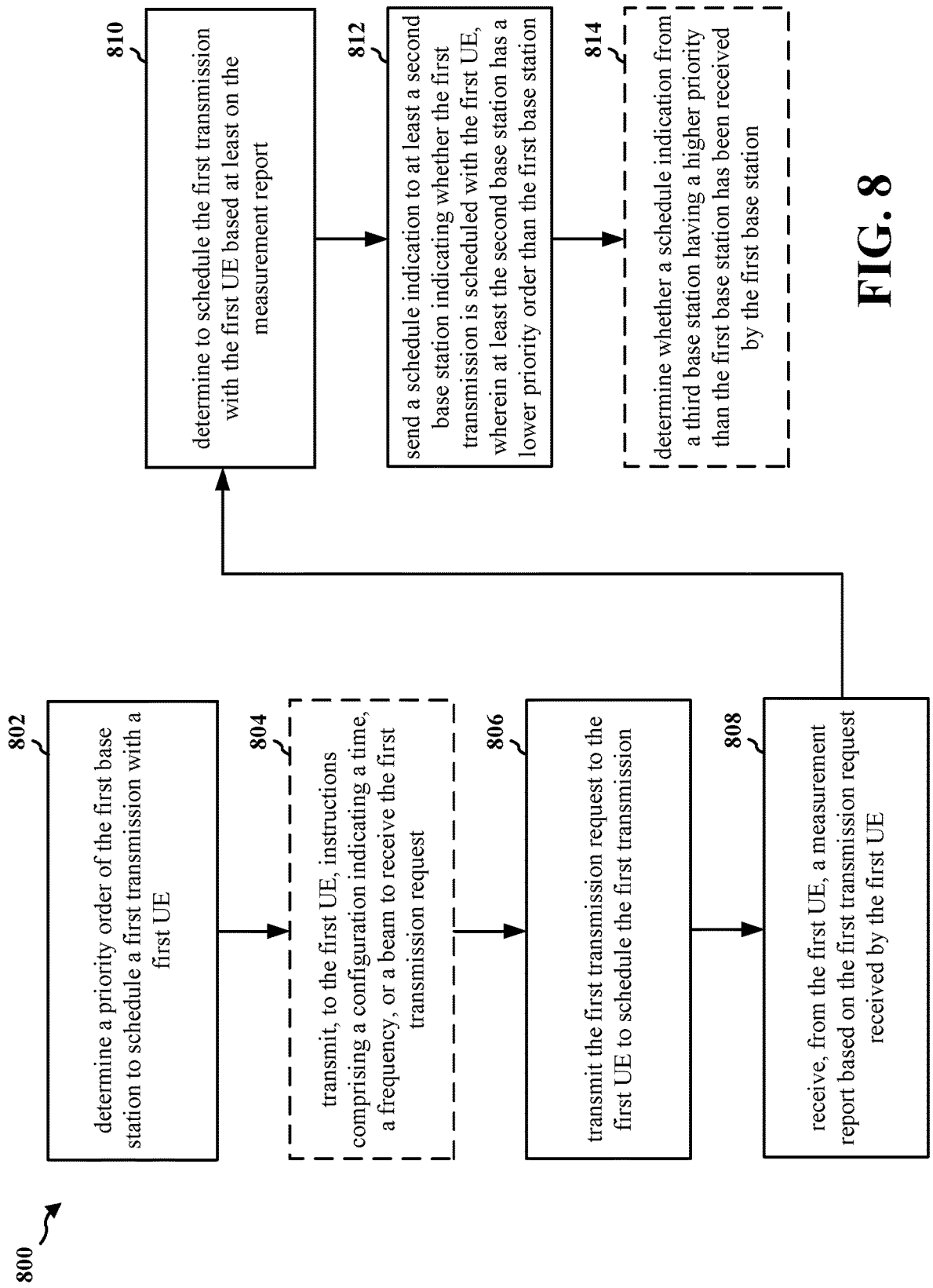
FIG. 8 is a flowchart of a method of wireless communication.

FIG. 8 is a flowchart 800 of a method of wireless communication. The method may be performed by a base station or a component of a base station (e.g., the base station 102/180, 502, 512, 602, 610, 704, 706; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to send a schedule indication to at least a second base station indicating whether a first transmission is scheduled with a first UE.

At 802, the first base station may determine a priority order of the first base station. For example, 802 may be performed by priority component 940 of apparatus 902. The first base station may determine the priority order of the first base station to schedule a first transmission with a first UE. In some aspects, the first base station may be within a group of base stations. In some aspects, a time duration of the priority order may comprise one or more slots.

In some aspects, for example at 804, the first base station may transmit, to the first UE, instructions comprising a configuration indicating a time, a frequency, or a beam for the first UE to receive the first transmission request. For example, 804 may be performed by instructions component 942 of apparatus 902. In some aspects, the instructions may include instructions for the first UE to receive at least a second transmission request from at least the second base station. The second transmission request from at least the second base station configuring at least a second transmission for a second UE. In some aspects, the first transmission request may be transmitted via CSI-RS or SSB.

At 806, the first base station may transmit the first transmission request to the first UE. For example, 806 may be performed by request component 944 of apparatus 902. The first base station may transmit the first transmission request to the first UE to schedule the first transmission. In some aspects, to transmit the first transmission request, the first base station may transmit the first transmission request using a first beam. The first beam may be used to transmit the first transmission to the first UE. The first beam may be a PDSCH beam of the first UE.

At 808, the first base station may receive a measurement report. For example, 808 may be performed by report component 946 of apparatus 902. The first base station may receive the measurement report from the first UE. The measurement report may be based on the first transmission requested received by the first UE. The measurement report may indicate a signal quality of the first transmission request. In some aspects, receipt of the measurement report, from the first UE, may be triggered in response to the first base station transmitting the first transmission request.

At 810, the first base station may determine to schedule the first transmission with the first UE based at least on the measurement report. For example, 810 may be performed by schedule component 948 of apparatus 902. In some aspects, the measurement report indicates a signal power, a SNR, or an SINR or a link between the first base station and the first UE. In some aspects, the measurement report may indicate interference measurements from at least the second base station. In some aspects, the measurement report may reject the first transmission request if the measurement report indicates that the interference measurements from at least the second base station exceed a threshold. In some aspects, the measurement report may approve the first transmission request if the measurement report indicates that the interference measurements from at least the second base station do not exceed the threshold. In some aspects, to determine to schedule the first transmission with the first UE, the first base station may determine whether the measurement report indicates that the signal quality of the first transmission request is interfered by at least the second base station. In some aspects, the first base station may send the schedule indication to at least the second base station indicating that the first transmission is scheduled with the first UE if interference from at least the second base station does not exceed a threshold. In some aspects, the first base station may send the schedule indication to at least the second base station indicating that the first transmission is not scheduled with the first UE if the interference from at least the second base station does exceed the threshold.

At 812, the first base station may send a schedule indicating to at least the second base station indicating whether the first transmission is scheduled with the first UE. For example, 812 may be performed by indication component 950 of apparatus 902. The at least the second base station having a lower priority order than the first base station. In some aspects, the first base station may transmit the schedule indication to the first UE to indicate whether the first transmission is scheduled with the first UE. In some aspects, to send the schedule indication, the first base station may send an interference report to at least the second base station. The interference report may indicate that the at least the second base station interferes with the first transmission between the first base station and the first UE. In some aspects, the interference report may prevent at least the second base station from scheduling a second transmission with a second UE if at least the second base station interferes with the first transmission between the first base station and the first UE.

In some aspects, for example at 814, the first base station may determine whether a schedule indication from a third base station has been received by the first base station. For example, 814 may be performed by schedule component 948 of apparatus 902. In some aspects, the third base station may have a higher priority than the first base station. The schedule indication from the third base station may indicate whether the third base station has scheduled a third transmission with a third UE. In some aspects, the first base station may determine to schedule the first transmission with the first UE based at least on the schedule indication from the third base station. For example, the first base station may determine to schedule the first transmission with the first UE if the schedule indication from the third base station indicates that the first transmission would interfere with the third transmission between the third base station and the third UE.

Figure 9:
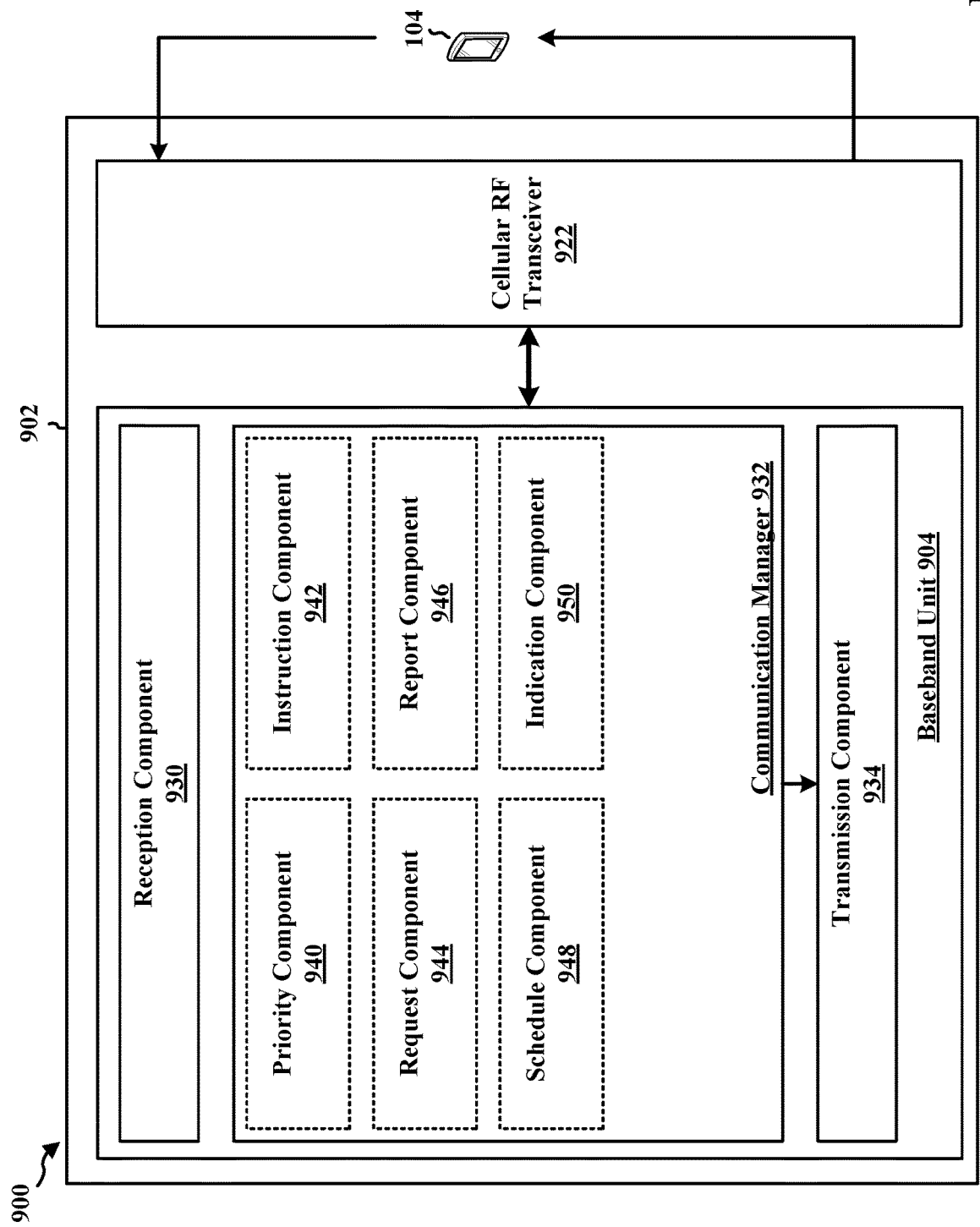
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a priority component 940 that may determine a priority order of the first base station, e.g., as described in connection with 802 of FIG. 8. The communication manager 932 further includes an instruction component 942 that may transmit, to the first UE, instructions comprising a configuration indicating a time, a frequency, or a beam for the first UE to receive the first transmission request, e.g., as described in connection with 804 of FIG. 8. The communication manager 932 further includes a request component 944 that may transmit the first transmission request to the first UE, e.g., as described in connection with 806 of FIG. 8. The communication manager 932 further includes a report component 946 that may receive a measurement report, e.g., as described in connection with 808 of FIG. 8. The communication manager 932 further includes a schedule component 948 that may determine to schedule the first transmission with the first UE based at least on the measurement report, e.g., as described in connection with 810 of FIG. 8. The schedule component 948 may be configured to determine whether a schedule indication from a third base station has been received by the first base station, e.g., as described in connection with 814 of FIG. 8. The communication manager 932 further includes an indication component 950 that may send a schedule indicating to at least the second base station indicating whether the first transmission is scheduled with the first UE, e.g., as described in connection with 812 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for determining a priority order of the first base station to schedule a first transmission with a first UE. The apparatus includes means for transmitting a first transmission request to the first UE to schedule the first transmission. The apparatus includes means for receiving, from the first UE, a measurement report based on the first transmission request received by the first UE. The measurement report indicates a signal quality of the first transmission request. The apparatus includes means for determining to schedule the first transmission with the first UE based at least on the measurement report. The apparatus includes means for sending a schedule indication to at least a second base station indicating whether the first transmission is scheduled with the first UE. At least the second base station has a lower priority order than the first base station. The apparatus further includes means for transmitting, to the first UE, instructions comprising a configuration indicating a time, a frequency, or a beam for the first UE to receive the first transmission request. The apparatus further includes means for determining whether a schedule indication from a third base station having a higher priority than the first base station has been received by the first base station. The schedule indication from the third base station indicates whether the third base station has scheduled a third transmission with a third UE. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
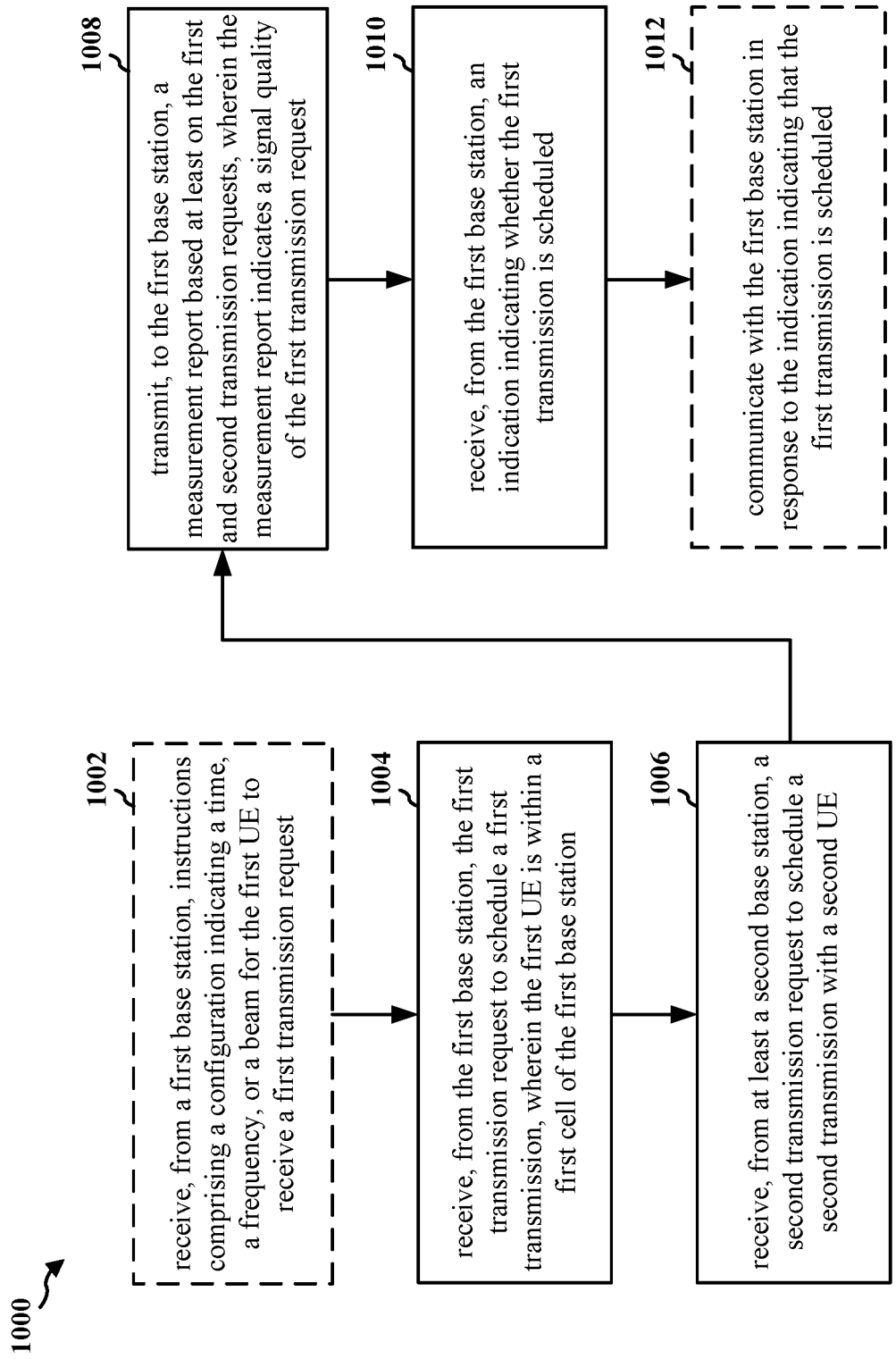
FIG. 10 is a flowchart of a method of wireless communication.

FIG. 10 is a flowchart 1000 of a method of wireless communication. The method may be performed by a UE or a component of a UE (e.g., the UE 104, 504, 506, 514, 516, 604, 606, 612, 614, 702; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to transmit a measurement report to a base station to indicate the link quality between the UE and the base station.

In some aspects, for example at 1002, a first UE may receive instructions comprising a configuration indicating a time, a frequency, or a beam for the first UE to receive a first transmission request. For example, 1002 may be performed by instructions component 1140 of apparatus 1102. The first UE may receive the instructions comprising the configuration from a first base station. In some aspects, the instructions may include instructions for the first UE to receive at least a second transmission request from at least a second base station. The first UE may receive the instructions, from the first base station, via RRC signaling.

At 1004, the first UE may receive the first transmission request. For example, 1004 may be performed by request component 1142 of apparatus 1102. The first UE may receive the first transmission request from the first base station. The first transmission request may schedule a first transmission. The first UE may be within a first cell of the first base station.

At 1006, the first UE may receive a second transmission request. For example, 1006 may be performed by request component 1142 of apparatus 1102. The first UE may receive the second transmission request from at least a second base station. The second transmission request may schedule a second transmission with a second UE. In some aspects, the first transmission request and at least the second transmission request may be received by the first UE using a same receive beam. The first transmission request and at least the second transmission request may be received based on a priority of the first base station and at least the second base station.

At 1008, the first UE may transmit a measurement report. For example, 1008 may be performed by report component 1144 of apparatus 1102. The first UE may transmit the measurement report to the first base station. The measurement report may be based at least on the first and second transmission request. The measurement report may indicate a signal quality of the first transmission request. In some aspects, the measurement report may include interference measurements from at least the second base station. In some aspects, the measurement report may reject the first transmission request if the measurement report indicates that the interference measurements from at least the second base station exceeds a threshold. In some aspects, the measurement report may approve the first transmission request if the measurement report indicates that the interference measurements from at least the second base station do not exceed the threshold. In some aspects, the measurement report may be transmitted to the first base station in response to the first UE receiving the first transmission request. In some aspects, the measurement report may indicate a signal strength of the first transmission request, a RSRP value of the first transmission request, an interference value, or interference measurements received at the first UE, or whether interference measurements received at the first UE exceed a threshold.

At 1010, the first UE may receive an indication indicating whether the first transmission is scheduled. For example, 1010 may be performed by indication component 1146 of apparatus 1102. The first UE may receive the indication indicating whether the first transmission is scheduled from the first base station.

In some aspects, for example at 1012, the first UE may communicate with the first base station. For example, 1012 may be performed by communication component 1148 of apparatus 1102. The first UE may communicate with the first base station in response to receiving the indication indicating that the first transmission is scheduled.

Figure 11:
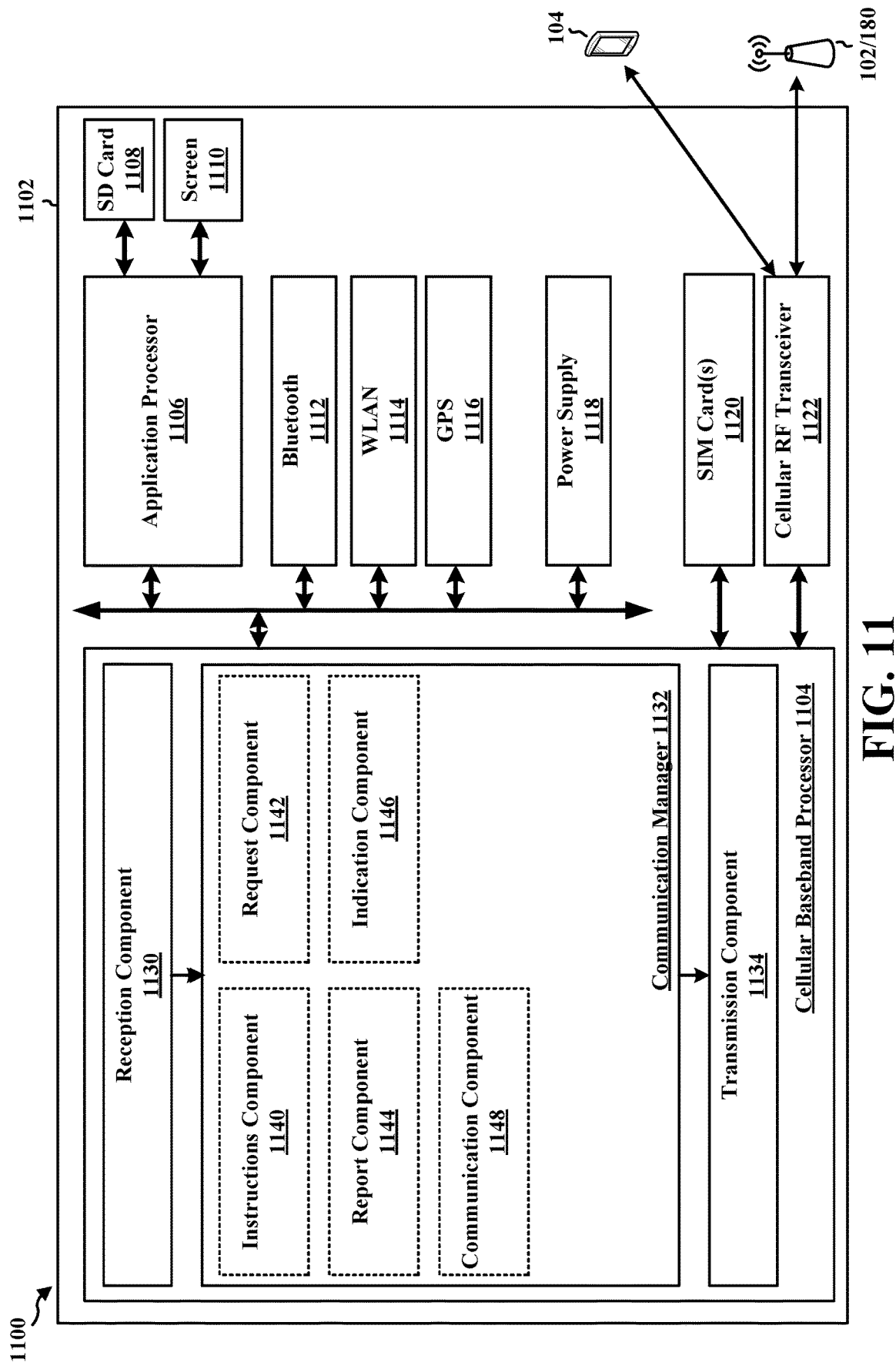
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the cellular baseband processor 1104, and in another configuration, the apparatus 1102 may be the entire UE (e.g., see 350 of FIG. 3) and include the aforediscussed additional modules of the apparatus 1102.

The communication manager 1132 includes an instructions component 1140 that is configured to receive instructions comprising a configuration indicating a time, a frequency, or a beam for the first UE to receive a first transmission request, e.g., as described in connection with 1002 of FIG. 10. The communication manager 1132 further includes a request component 1142 that is configured to receive the first transmission request, e.g., as described in connection with 1004 of FIG. 10. The request component 1142 may be configured to receive a second transmission request, e.g., as described in connection with 1006 of FIG. 10. The communication manager 1132 further includes a report component 1144 that is configured to transmit a measurement report, e.g., as described in connection with 1008 of FIG. 10. The communication manager 1132 further includes an indication component 1146 that is configured to receive an indication indicating whether the first transmission is scheduled, e.g., as described in connection with 1010 of FIG. 10. The communication manager 1132 further includes a communication component 1148 that is configured to communicate with the first base station, e.g., as described in connection with 1012 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a first base station, a first transmission request to schedule a first transmission, wherein the first UE is within a first cell of the first base station. The apparatus includes means for receiving, from at least a second base station, a second transmission request to schedule a second transmission with a second UE. The apparatus includes means for transmitting, to the first base station, a measurement report based at least on the first and second transmission requests. The measurement report indicates a signal quality of the first transmission request. The apparatus includes means for receiving, from the first base station, an indication indicating whether the first transmission is scheduled. The apparatus further includes means for receiving, from the first base station, instructions comprising a configuration indicating a time, a frequency, or a beam for the first UE to receive the first transmission request. The apparatus further includes means for communicating with the first base station in response to the indication indicating that the first transmission is scheduled. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a first base station comprising determining a priority order of the first base station to schedule a first transmission with a first UE; transmitting a first transmission request to the first UE to schedule the first transmission; receiving, from the first UE, a measurement report based on the first transmission request received by the first UE, wherein the measurement report indicates a signal quality of the first transmission request; determining to schedule the first transmission with the first UE based at least on the measurement report; and sending a schedule indication to at least a second base station indicating whether the first transmission is scheduled with the first UE, wherein at least the second base station has a lower priority order than the first base station.

In Aspect 2, the method of Aspect 1 further includes that sending the schedule indication further comprises transmitting the schedule indication to the first UE to indicate whether the first transmission is scheduled with the first UE.

In Aspect 3, the method of Aspect 1 or 2 further includes transmitting, to the first UE, instructions comprising a configuration indicating a time, a frequency, or a beam for the first UE to receive the first transmission request.

In Aspect 4, the method of any of Aspects 1-3 further includes that the instructions further include instructions for the first UE to receive at least a second transmission request from at least the second base station.

In Aspect 5, the method of any of Aspects 1-4 further includes that transmitting the first transmission request further comprises transmitting the first transmission request using a first beam, wherein the first beam is used to transmit the first transmission to the first UE.

In Aspect 6, the method of any of Aspects 1-5 further includes that the first beam is a PDSCH beam of the first UE.

In Aspect 7, the method of any of Aspects 1-6 further includes that the measurement report indicates a signal power, a SNR, or an SINR of a link between the first base station and the first UE.

In Aspect 8, the method of any of Aspects 1-7 further includes that the measurement report indicates interference measurements from at least the second base station.

In Aspect 9, the method of any of Aspects 1-8 further includes that the measurement report rejects the first transmission request if the measurement report indicates that interference measurements from at least the second base station exceed a threshold, and wherein the measurement report approves the first transmission request if the measurement report indicates that interference measurements from at least the second base station do not exceed the threshold.

In Aspect 10, the method of any of Aspects 1-9 further includes that receipt of the measurement report, from the first UE, is triggered in response to the first base station transmitting the first transmission request.

In Aspect 11, the method of any of Aspects 1-10 further includes that the determining to schedule the first transmission with the first UE includes determining whether the measurement report indicates that the signal quality of the first transmission request is interfered by at least the second base station.

In Aspect 12, the method of any of Aspects 1-11 further includes that the first base station sends the schedule indication to at least the second base station indicating that the first transmission is scheduled with the UE if interference from at least the second base station does not exceed a threshold, wherein the first base station sends the schedule indication to at least the second base station indicating that the first transmission is not scheduled with the UE if the interference from at least the second base station does exceed the threshold.

In Aspect 13, the method of any of Aspects 1-12 further includes that a time duration of the priority order comprises one or more slots.

In Aspect 14, the method of any of Aspects 1-13 further includes that the first transmission request is transmitted via CSI-RS or SSB.

In Aspect 15, the method of any of Aspects 1-14 further includes that the sending the schedule indication further comprising sending an interference report to at least the second base station, wherein the interference report indicates that at least the second base station interferes with the first transmission between the first base station and the first UE.

In Aspect 16, the method of any of Aspects 1-15 further includes that the interference report prevents at least the second base station from scheduling a second transmission with a second UE if at least the second base station interferes with the first transmission between the first base station and the first UE.

In Aspect 17, the method of any of Aspects 1-16 further includes determining whether a schedule indication from a third base station having a higher priority than the first base station has been received by the first base station, wherein the schedule indication from the third base station indicates whether the third base station has scheduled a third transmission with a third UE.

In Aspect 18, the method of any of Aspects 1-17 further includes that the first base station determines to schedule the first transmission with the first UE based at least on the schedule indication from the third base station.

Aspect 19 is a device including one or more processors and one or more memories in electronic communication with the one or more processors storing instructions executable by the one or more processors to cause the system or apparatus to implement a method as in any of Aspects 1-18.

Aspect 20 is a system or apparatus including means for implementing a method or realizing an apparatus as in any of Aspects 1-18.

Aspect 21 is a non-transitory computer readable medium storing instructions executable by one or more processors to cause the one or more processors to implement a method as in any of Aspects 1-18.

Aspect 22 is a method of wireless communication at a first UE comprising receiving, from a first base station, a first transmission request to schedule a first transmission, wherein the first UE is within a first cell of the first base station; receiving, from at least a second base station, a second transmission request to schedule a second transmission with a second UE; transmitting, to the first base station, a measurement report based at least on the first and second transmission requests, wherein the measurement report indicates a signal quality of the first transmission request; and receiving, from the first base station, an indication indicating whether the first transmission is scheduled.

In Aspect 23, the method of Aspect 22 further includes that the measurement report includes interference measurements from at least the second base station.

In Aspect 24, the method of Aspect 22 or 23 further includes that the measurement report rejects the first transmission request if the measurement report indicates that interference measurements from at least the second base station exceed a threshold, and wherein the measurement report approves the first transmission request if the measurement report indicates that interference measurements from at least the second base station do not exceed the threshold.

In Aspect 25, the method of any of Aspects 22-24 further includes receiving, from the first base station, instructions comprising a configuration indicating a time, a frequency, or a beam for the first UE to receive the first transmission request.

In Aspect 26, the method of any of Aspects 22-25 further includes that the instructions further include instructions for the first UE to receive at least the second transmission request from at least the second base station.

In Aspect 27, the method of any of Aspects 22-26 further includes that the measurement report is transmitted to the first base station in response to the UE receiving the first transmission request.

In Aspect 28, the method of any of Aspects 22-27 further includes communicating with the first base station in response to the indication indicating that the first transmission is scheduled.

In Aspect 29, the method of any of Aspects 22-28 further includes that the first transmission request and at least the second transmission request are received by the UE using a same receive beam.

In Aspect 30, the method of any of Aspects 22-29 further includes that the first transmission request and at least the second transmission request are received based on a priority order of the first base station and at least the second base station.

In Aspect 31, the method of any of Aspects 22-30 further includes that the measurement report indicates a signal strength of the first transmission request, a RSRP value of the first transmission request, an interference value, or interference measurements received at the first UE, or whether interference measurements received at the first UE exceed a threshold.

Aspect 32 is a device including one or more processors and one or more memories in electronic communication with the one or more processors storing instructions executable by the one or more processors to cause the system or apparatus to implement a method as in any of Aspects 22-31.

Aspect 33 is a system or apparatus including means for implementing a method or realizing an apparatus as in any of Aspects 22-31.

Aspect 34 is a non-transitory computer readable medium storing instructions executable by one or more processors to cause the one or more processors to implement a method as in any of Aspects 22-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first base station, comprising:

determining a priority order of the first base station to schedule a first transmission with a first user equipment (UE);

transmitting a first transmission request to the first UE to schedule the first transmission;

receiving, from the first UE, a measurement report based on the first transmission request received by the first UE, wherein the measurement report indicates a signal quality of the first transmission request;

determining to schedule the first transmission with the first UE based at least on the measurement report; and sending a schedule indication to at least a second base station indicating whether the first transmission is scheduled with the first UE, wherein at least the second base station has a lower priority order than the first base station.

2. The method of claim 1, wherein sending the schedule indication further comprises transmitting the schedule indication to the first UE to indicate whether the first transmission is scheduled with the first UE.

3. The method of claim 1, further comprising:

transmitting, to the first UE, instructions comprising a configuration indicating a time, a frequency, or a beam for the first UE to receive the first transmission request.

4. The method of claim 3, wherein the instructions further include instructions for the first UE to receive at least a second transmission request from the second base station.

5. The method of claim 1, wherein transmitting the first transmission request further comprises transmitting the first transmission request using a first beam, wherein the first beam is used to transmit the first transmission to the first UE.

6. The method of claim 5, wherein the first beam is a physical downlink shared channel (PDSCH) beam of the first UE.

7. The method of claim 1, wherein the measurement report indicates a signal power, a signal to noise ratio (SNR), or a signal to interference noise ratio (SINR) of a link between the first base station and the first UE.

8. The method of claim 1, wherein the measurement report indicates interference measurements from at least the second base station.

9. The method of claim 8, wherein the measurement report rejects the first transmission request if the measurement report indicates that interference measurements from at least the second base station exceed a threshold, and wherein the measurement report approves the first transmission request if the measurement report indicates that interference measurements from at least the second base station do not exceed the threshold.

10. The method of claim 1, wherein receipt of the measurement report, from the first UE, is triggered in response to the first base station transmitting the first transmission request.

11. The method of claim 1, wherein the determining to schedule the first transmission with the first UE includes determining whether the measurement report indicates that the signal quality of the first transmission request is interfered by at least the second base station.

12. The method of claim 11, wherein the first base station sends the schedule indication to at least the second base station indicating that the first transmission is scheduled with the UE if an interference from at least the second base station does not exceed a threshold, wherein the first base station sends the schedule indication to at least the second base station indicating that the first transmission is not scheduled with the UE if the interference from at least the second base station does exceed the threshold.

13. The method of claim 1, wherein a time duration of the priority order comprises one or more slots.

14. The method of claim 1, wherein the first transmission request is transmitted via channel state information reference signal (CSI-RS) or synchronization signal block (SSB).

15. The method of claim 1, wherein the sending the schedule indication further comprising sending an interference report to at least the second base station, wherein the interference report indicates that at least the second base station interferes with the first transmission between the first base station and the first UE.

16. The method of claim 15, wherein the interference report prevents at least the second base station from scheduling a second transmission with a second UE if at least the second base station interferes with the first transmission between the first base station and the first UE.

17. The method of claim 1, further comprising:
determining whether a schedule indication from a third base station having a higher priority than the first base station has been received by the first base station, wherein the schedule indication from the third base station indicates whether the third base station has scheduled a third transmission with a third UE.

18. The method of claim 17, wherein the first base station determines to schedule the first transmission with the first UE based at least on the schedule indication from the third base station.

19. An apparatus for wireless communication at a first base station, comprising:

a memory; and at least one processor coupled to the memory and configured to:

determine a priority order of the first base station to schedule a first transmission with a first user equipment (UE);

transmit a first transmission request to the first UE to schedule the first transmission;

receive, from the first UE, a measurement report based on the first transmission request received by the first UE, wherein the measurement report indicates a signal quality of the first transmission request;

determine to schedule the first transmission with the first UE based at least on the measurement report; and send a schedule indication to at least a second base station indicating whether the first transmission is scheduled with the first UE, wherein at least the second base station has a lower priority order than the first base station.

* * * * *